US010573277B2

(12) United States Patent
Mano et al.

(10) Patent No.: US 10,573,277 B2
(45) Date of Patent: Feb. 25, 2020

(54) DISPLAY DEVICE, DISPLAY SYSTEM, AND NON-TRANSITORY RECORDING MEDIUM, TO ADJUST POSITION OF SECOND IMAGE IN ACCORDANCE WITH ADJUSTED ZOOM RATIO OF FIRST IMAGE

(71) Applicant: RICOH COMPANY, LTD., Tokyo (JP)

(72) Inventors: Takuro Mano, Kanagawa (JP); Yoko Sugiura, Kanagawa (JP); Taeko Ishizu, Kanagawa (JP); Takahiro Kamekura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/444,684

(22) Filed: Feb. 28, 2017

(65) Prior Publication Data

US 2017/0186407 A1    Jun. 29, 2017

Related U.S. Application Data

(63) Continuation of application No. PCT/JP2015/075888, filed on Sep. 11, 2015.

(30) Foreign Application Priority Data

Sep. 16, 2014    (JP) .................................. 2014-188165

(51) Int. Cl.
*G09G 5/00* (2006.01)
*G09G 5/38* (2006.01)
(Continued)

(52) U.S. Cl.
CPC ................. *G09G 5/38* (2013.01); *G06F 3/14* (2013.01); *G09G 3/001* (2013.01); *G09G 5/377* (2013.01);
(Continued)

(58) Field of Classification Search
None
See application file for complete search history.

(56) References Cited

U.S. PATENT DOCUMENTS 5,311,316 A  *  5/1994  Sato ..................... H04N 5/7441
                                                        348/584
8,439,507 B2     5/2013  Ozawa
(Continued)

FOREIGN PATENT DOCUMENTS

JP    2006-295361    10/2006
JP    2009-152882     7/2009
(Continued)

OTHER PUBLICATIONS

European search report dated Aug. 22, 2017 in connection with corresponding European patent application No. 15842790.6.
(Continued)

*Primary Examiner* — Anh-Tuan V Nguyen
(74) *Attorney, Agent, or Firm* — Oblon, McClelland, Maier & Neustadt, L.L.P.

(57) ABSTRACT

A display device includes: a zoom ratio determining unit configured to determine whether a zoom ratio different from a current zoom ratio is set for a first image; a data type determining unit configured to determine a type of the first image; state determining unit configured to determine an operating state of the display device; a display item acquiring unit configured to acquire an item to be displayed in a second image that indicates information on the display device in accordance with the type that has been determined and the operating state that has been determined; and a position adjusting unit configured to adjust a display position of the second image in accordance with the zoom ratio that is different from the current zoom ratio set for the first
(Continued)

image, in response to the zoom ratio determining unit determining that the zoom ratio is set.

10 Claims, 15 Drawing Sheets

(51) Int. Cl.
  *G09G 5/377* (2006.01)
  *G06F 3/14* (2006.01)
  *G09G 3/00* (2006.01)
(52) U.S. Cl.
  CPC ............... *G09G 2340/045* (2013.01); *G09G 2340/0464* (2013.01); *G09G 2354/00* (2013.01); *G09G 2360/02* (2013.01); *G09G 2370/022* (2013.01); *G09G 2370/042* (2013.01); *G09G 2380/06* (2013.01)

(56) References Cited

U.S. PATENT DOCUMENTS

| | | | | |
|---|---|---|---|---|
| 2005/0223339 | A1* | 10/2005 | Lee | G06F 3/0482 715/825 |
| 2006/0238627 | A1* | 10/2006 | Hagiwara | H04N 5/772 348/231.99 |
| 2007/0052733 | A1* | 3/2007 | Hirabayashi | G09G 3/002 345/661 |
| 2008/0238939 | A1* | 10/2008 | Tamura | H04N 5/44504 345/629 |
| 2009/0027557 | A1* | 1/2009 | Berbecel | H04N 5/445 348/589 |
| 2009/0162036 | A1 | 6/2009 | Fujii | |
| 2009/0225235 | A1* | 9/2009 | Fujisaki | H04N 7/0122 348/745 |
| 2010/0201879 | A1* | 8/2010 | VanDuyn | H04N 5/45 348/565 |
| 2011/0032221 | A1* | 2/2011 | Kobayashi | G09G 5/003 345/204 |
| 2011/0107222 | A1* | 5/2011 | Uchida | G06F 3/0425 715/730 |
| 2011/0145709 | A1* | 6/2011 | Yoo | G06F 17/30056 715/730 |
| 2011/0170021 | A1* | 7/2011 | Ozawa | G03B 21/26 348/744 |
| 2012/0026391 | A1* | 2/2012 | Furukawa | H04N 5/145 348/441 |
| 2012/0188457 | A1* | 7/2012 | Kato | H04N 5/23293 348/569 |
| 2013/0083058 | A1* | 4/2013 | Yoshimura | H04N 5/74 345/629 |
| 2014/0002440 | A1* | 1/2014 | Lynch | G06T 19/00 345/419 |
| 2014/0078160 | A1* | 3/2014 | Yang | G09G 5/001 345/531 |
| 2014/0192089 | A1* | 7/2014 | Honda | G06T 3/40 345/661 |
| 2014/0253581 | A1* | 9/2014 | Nobori | G09G 5/10 345/590 |
| 2014/0327758 | A1* | 11/2014 | Hsiung | G02B 21/368 348/79 |
| 2015/0015583 | A1* | 1/2015 | Watanabe | G06F 3/0482 345/428 |
| 2015/0302552 | A1* | 10/2015 | Lin | G06T 3/40 345/428 |
| 2015/0334337 | A1* | 11/2015 | Matsumoto | H04N 21/42653 348/569 |

FOREIGN PATENT DOCUMENTS

| | | |
|---|---|---|
| JP | 2009-212657 | 9/2009 |
| JP | 2011-142597 | 7/2011 |
| JP | 2012-151658 | 8/2012 |
| JP | 2014-048386 | 3/2014 |
| WO | WO2009/110435 A1 | 9/2009 |

OTHER PUBLICATIONS

International Search Report dated Dec. 8, 2015 in PCT/JP2015/075888 filed on Sep. 11, 2015.

* cited by examiner

FIG.10

| DATA TYPE | OPERATING STATE | DISPLAY ITEM | | | 240 |
|---|---|---|---|---|---|
| VIDEO DATA | PLAYING | STOP | FAST-FORWARD | REWIND | PAUSE |
| VIDEO DATA | STOP PLAYING | PLAY | MENU | END | |
| STILL IMAGE DATA | DISPLAYING STILL IMAGE | STOP | NEXT | PREVIOUS | |
| SLIDE SHOW DATA | PLAYING | END | NEXT | PREVIOUS | DISPLAY PERIOD SETTING |
| NOT YET DETERMINED | WAITING FOR INPUT | SELECT | DECIDE | STOP | |

| DEVICE TYPE IDENTIFICATION INFORMATION | DISPLAY ITEM TABLE |
|---|---|
| AA | DISPLAY ITEM TABLE 1 |
| BB | DISPLAY ITEM TABLE 2 |
| CC | DISPLAY ITEM TABLE 3 |
| DD | DISPLAY ITEM TABLE 4 |

320

DISPLAY DEVICE, DISPLAY SYSTEM, AND NON-TRANSITORY RECORDING MEDIUM, TO ADJUST POSITION OF SECOND IMAGE IN ACCORDANCE WITH ADJUSTED ZOOM RATIO OF FIRST IMAGE

CROSS-REFERENCE TO RELATED APPLICATIONS

The present application is a continuation application of International Application No. PCT/JP2015/075888, filed Sep. 11, 2015, which claims priority to Japanese Patent Application No. 2014-188165, filed Sep. 16, 2014. The contents of these applications are incorporated herein by reference in their entirety.

BACKGROUND OF THE INVENTION

1. Field of the Invention

The disclosure herein generally relates to a display device, a display system, and a non-transitory recording medium.

2. Description of the Related Art

As one type of display device that displays images, projectors that project and display images in accordance with image data have been known in a related art. Such projectors in a related art are capable of compositing OSD (On-Screen Display) images such as menu images or message images, and projecting the composite images on main images.

In displaying an image on a projector, however, the size and shape of the image projected on a screen changes depending on a distance between the projector and the screen or an angle between the projector and the screen. For this reason, some common projectors have a function of adjusting the size and shape of the displayed image, while maintaining positions of the projector and the screen, as disclosed in Japanese Unexamined Patent Application Publication No. 2011-142597.

With such a function, in increasing or reducing the size of a main image, it is possible to display an OSD image without increasing or reducing the size of the OSD image in order to prevent characters in the OSD image from being difficult to read.

SUMMARY OF THE INVENTION

In one embodiment, a display device is configured to display a first image. The display device includes: a zoom ratio determining unit configured to determine whether a zoom ratio different from a current zoom ratio is set for the first image whose size is adjustable; a data type determining unit configured to determine a type of the first image; a state determining unit configured to determine an operating state of the display device; a display item acquiring unit configured to acquire an item to be displayed in a second image that indicates information on the display device in accordance with the type that has been determined by the data type determining unit and the operating state that has been determined by the state determining unit; and a position adjusting unit configured to adjust a display position of the second image in accordance with the zoom ratio different from the current zoom ratio that is set for the first image, in response to the zoom ratio determining unit determining that the zoom ratio is set. The position adjusting unit calculates the display position of the second image, using a distance between a bottom end of the first image and a bottom end of the second image, and the zoom ratio that is set.

BRIEF DESCRIPTION OF THE DRAWINGS

FIG. 10 is a view of one example of a display item table;

DESCRIPTION OF THE PREFERRED EMBODIMENTS

Figure 1:
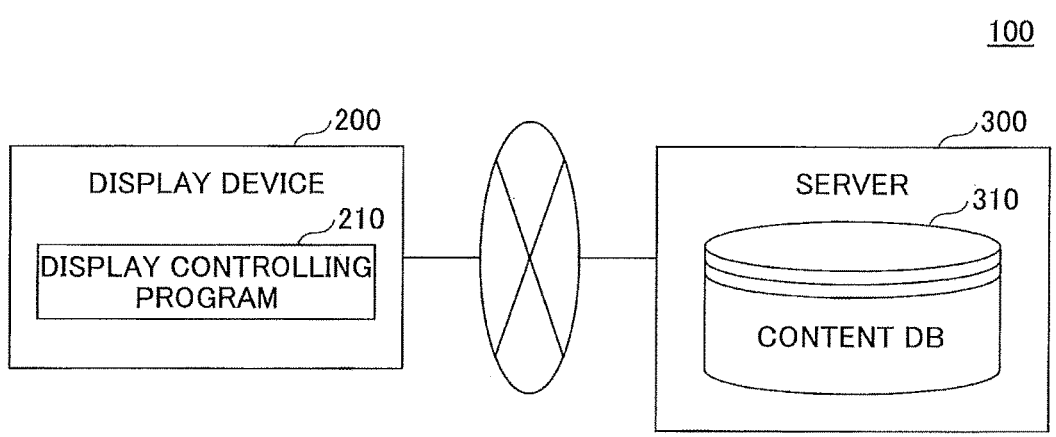
FIG. 1 is a view of one example of a system configuration of a display system in one embodiment.

In the following, embodiments of the present disclosure will be described with reference to the drawings. FIG. 1 is a view of one example of a system configuration of a display system in one embodiment.

A display system 100 in the present embodiment includes a display device 200, and a server 300. In the display system 100, the display device 200 and 300 can be coupled to each other via networks.

In the display device 200 in the present embodiment, a display controlling program 210 is installed. The server 300 includes a content database 310 in which content data are stored. The server 300 provides the display device 200 with the content data.

In the display system 100 in the present embodiment, the display device 200 is capable of displaying the content data provided from the server 300.

In the present embodiment, the display device 200 may be, for example, a projecting device such as a projector, an electronic whiteboard, or a digital signage. In the following description in the present embodiment, the display device 200 is assumed to be a projector. Therefore, the display area in the following description denotes a projection area of an image projected by the projector.

The display system 100 illustrated in FIG. 1 includes a single server 300 that provides the content data. However, the present embodiment is not limited to this. A plurality of servers 300 that provide content data may reside on a network N. The display device 200 may acquire desired content data from any of the servers 300.

In the present embodiment, the content data may include not only a single piece of image data such as a photograph but also a plurality of image data to be provided as a slide show to a user or video data. In the present embodiment, the video data will be described as a group of image data (a group of frames). In addition, the content data in the present embodiment may include voice data.

In the display system 100 in the present embodiment, for example, when the display device 200 performs a digital zoom process, the display device 200 may adjust the display position of the OSD (On-Screen Display) image, so as to accommodate the OSD image to be superimposed within the image displayed based on the content data.

In the present embodiment, the OSD image is displayed as described above. The display device 200 may, with respect to the display area, eliminate the area where only the OSD image is displayed, and may enable possible use of the display area for displaying the content data.

Note that the digital zoom process in the present embodiment may be a process of zooming in or out the image to be displayed, by trimming a given range of the image data included in the content data and increasing or reducing the size of the image data in accordance with an operation based on a zoom ratio that has been set.

The OSD image in the present embodiment may be an image that displays, for example, a guide screen for operating the display device 200 and/or a setting screen of the display device 200.

In the following, an outline of a process performed by the display device 200 in the present embodiment will be described with reference to FIG. 2A and FIG. 2B.

In the following description in the present embodiment, an image to be displayed in accordance with content data is referred to as a main image. FIG. 2A and FIG. 2B are views of outlines of processes performed by the display device in a first embodiment. FIG. 2A is a view of a display example in a case where the display area and the main image have the same size. FIG. 2B is a view of a display example in a case where the size of the main image is reduced.

Figure 2A:
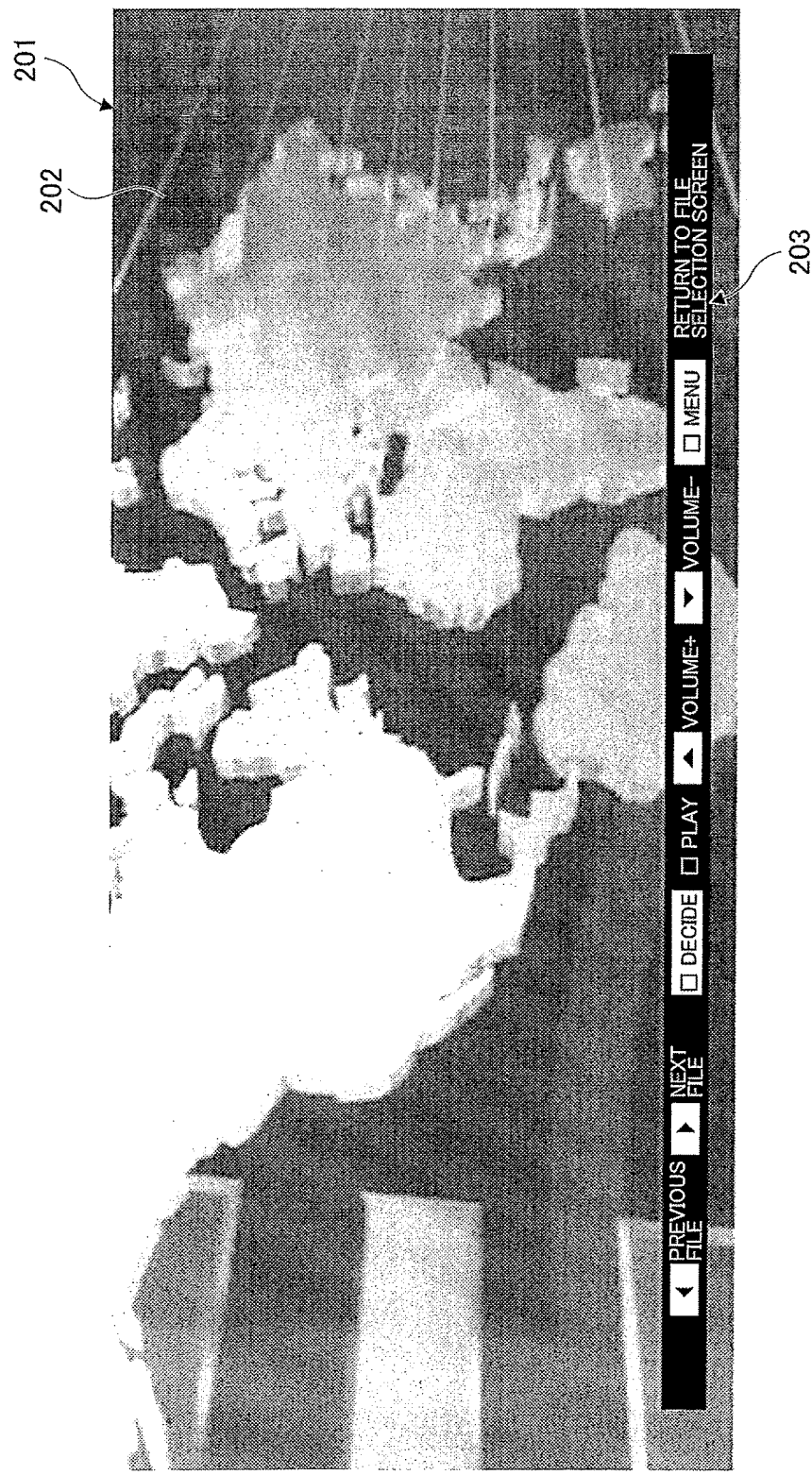
FIG. 2A is a view of an outline of a process performed by a display device in one embodiment.

In FIG. 2A, a display area 201 displays a main image 202 having the same size as the size of the display area 201. An OSD image 203 is displayed and superimposed on the main image 202.

Figure 2B:
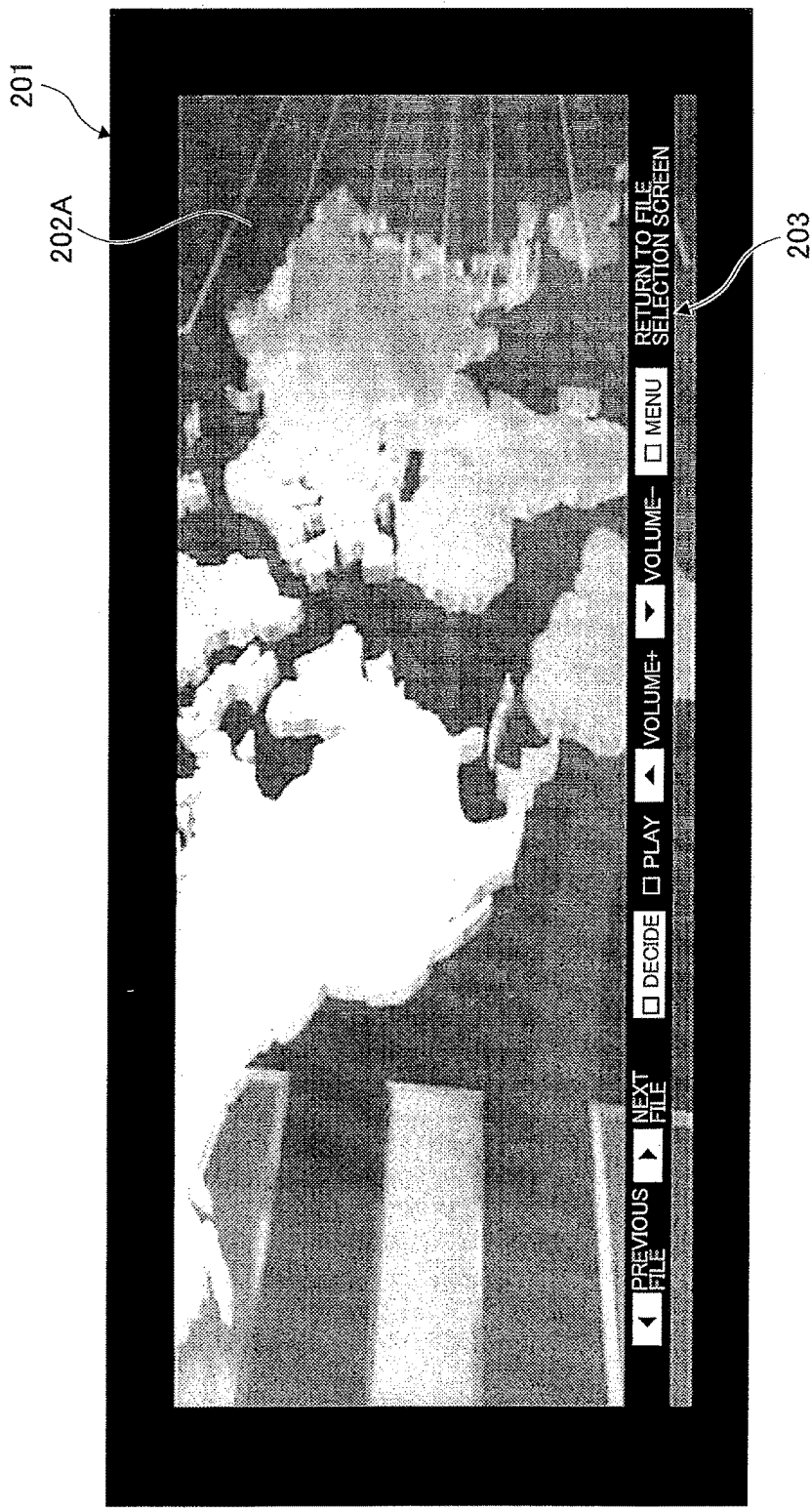
FIG. 2B is a view of an outline of a process performed by the display device in one embodiment.

In the present embodiment, when the zoom ratio is set in the state of FIG. 2A, the display device 200 displays the OSD image 203 so that the OSD image 203 is accommodated within the main image 202 after the zoom ratio is applied, as illustrated in FIG. 2B.

A main image 202A illustrated in FIG. 2B is an image obtained by, for example, reducing the size of the main image 202 to 90%. In FIG. 2B, the display device 200 displays an OSD image 203 so that the OSD image 203 is accommodated within the main image 202A. In other words, the entirety of the OSD image 203 in the present embodiment is superimposed on the main image 202.

Hence, in the present embodiment, even when the size of the main image 202 is reduced, the OSD image 203 is not displayed at the outside of the main image 202A whose size has been reduced. That is, the display device is capable of displaying the OSD image 203 within the main image 202A. The display area 201 is used effectively, accordingly.

Figure 3:
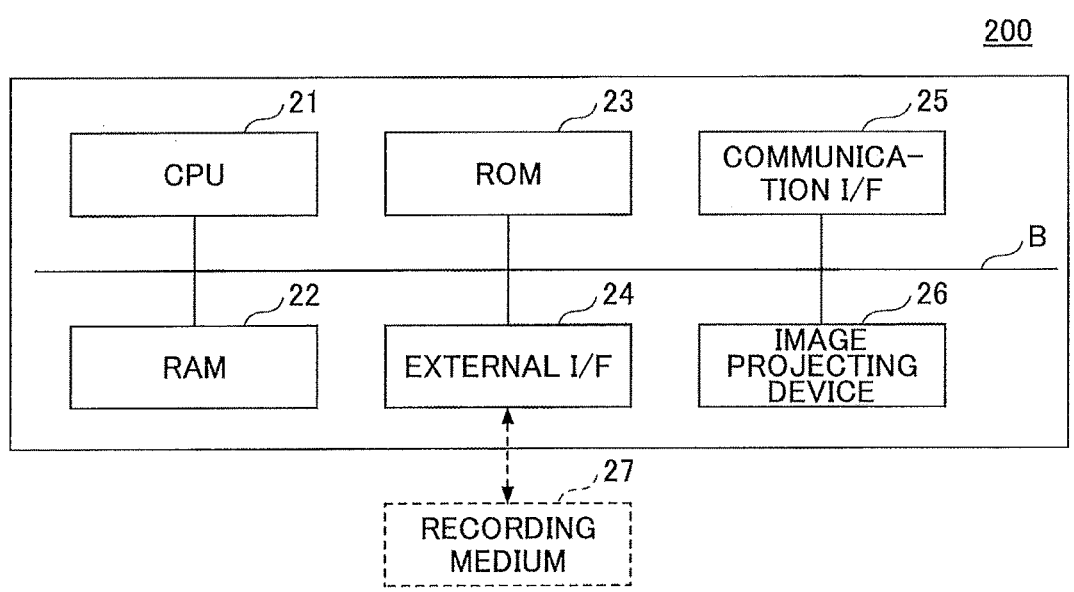
FIG. 3 is a view of one example of a hardware configuration of the display device.

Next, each of the devices included in the display system 100 will be described. FIG. 3 is a view of one example of a hardware configuration of the display device.

The display device 200 in the present embodiment may include a CPU (Central Processing Unit) 21, a RAM (Random Access Memory), a ROM (Read Only Memory) 23, an external I/F 24, a communication I/F 25, and an image projecting device 26. The above devices may be coupled to each other via a bus B.

The CPU 21 is a processing device that enables the whole control or functions of the display device 200, by reading a program and/or data from a memory device such as the ROM 23, writing the program and/or data into the RAM 22, and performing a process.

The RAM 22 is a volatile semiconductor memory (memory device) that temporarily stores programs and/or data. The data temporarily held in the RAM 22 is, for example, image data to be displayed on the display device 200. Specifically, the RAM 22 may function as an image memory that stores the image data of an image to be displayed on the display device 200.

The ROM 23 is a non-volatile semiconductor memory (memory device) capable of storing the programs or data, even when the power is off.

The external I/F 24 is an interface with an external device. The external device is, for example, a recording medium 27. In the recording medium 27, content data to be played on the display device 200 and/or a program configured to achieve one or more embodiments can be stored. The display device 200 is capable of reading data recorded in the recording medium 27 via the external I/F 24. Additionally, the display device 200 is capable of writing data into the recording medium 27 via the external I/F 24.

The recording medium 27 may be, for example, a USB memory (Universal Serial Bus memory) or an SD memory card (SD Memory card). The recording medium 27 may be; for example, a DVD (Digital Versatile Disk), a CD (Compact Disk), or a flexible disk.

The communication I/F 25 is an interface for coupling the display device 200 to the network N. The display device 200 is capable of performing data communication via the communication I/F 25. For example, the display device 200 is capable of acquiring content data through the communication I/F 25 from the server 300.

The image projecting device 26 may include an optical unit or an optical source. The optical unit may include, for example, an optical component such as a lens or a mirror. The light source may be, for example, a mercury lamp. By projecting on a screen the image data held by the RAM 22 (i.e., image memory), the image projecting device 26 is capable of displaying the image data on the screen.

With the above-described hardware configuration, the display device 200 in the present embodiment is capable of performing various processes to be described below.

Note that the hardware configuration of the server 300 in the present embodiment is similar to the hardware configuration of a common computer including the CPU and memories. Hence, the description of the hardware configuration of the server 300 is omitted.

Figure 4:
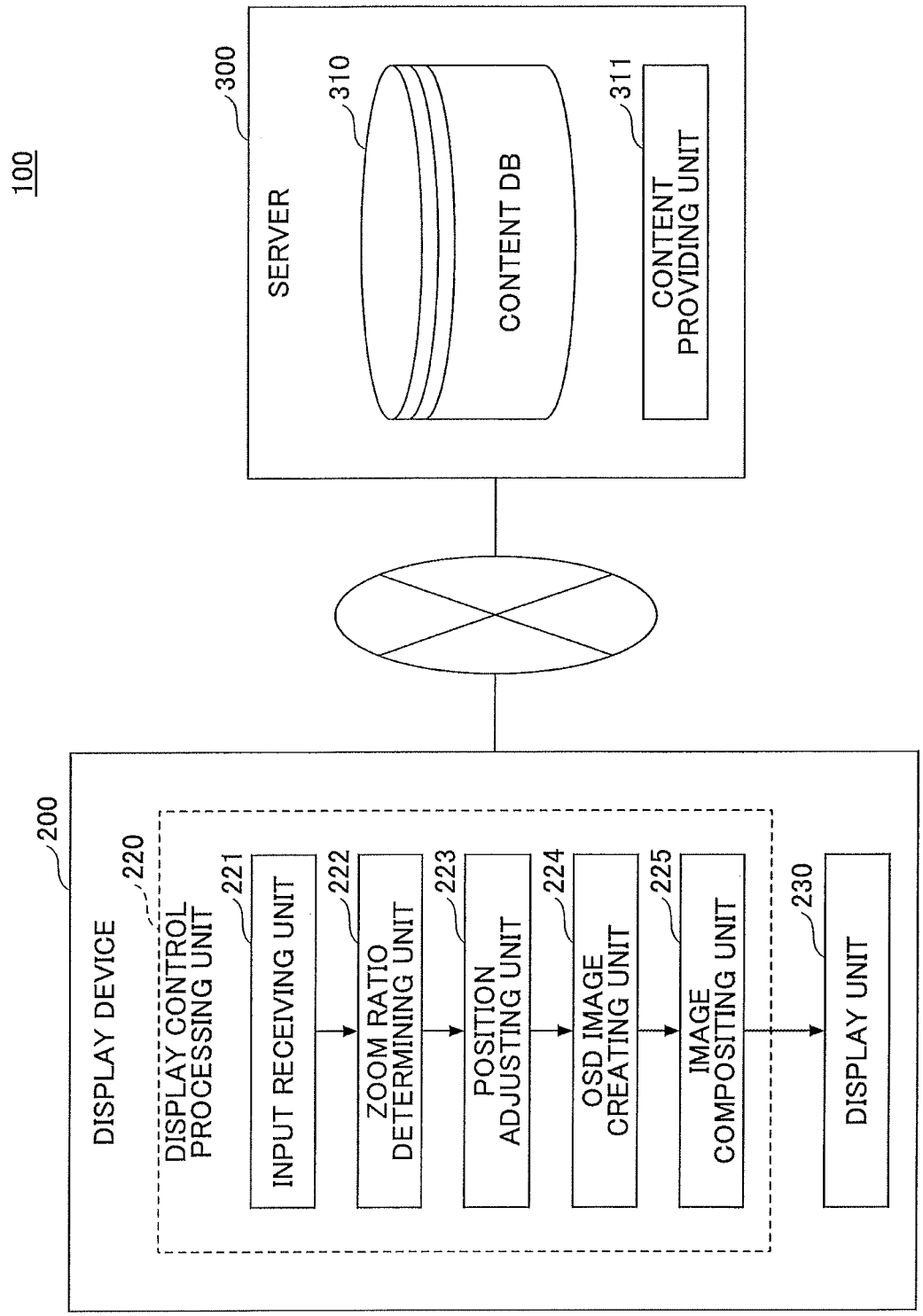
FIG. 4 is a view of one example of a functional configuration of devices included in the display system in one embodiment.

Next, referring to FIG. 4, functions of the devices included in the display system 100 in the present embodiment will be described. FIG. 4 is a view of one example of a functional configuration of the devices included in the display system in one embodiment.

The display device 200 in the present embodiment may include a display control processing unit 220 and a display unit 230. The display control processing unit 220 may be enabled by the CPU 21 performing the display controlling program 210.

The display control unit 220 in the present embodiment creates a composite image in which the main image based on the content data and the OSD image are superimposed in response to a signal input into the display device 200. The display control unit 220 will be described later in detail.

By causing the image projecting device 26 to project the composite image that has been created by the display control unit 220, the display unit 230 in the present embodiment is capable of displaying the composite image on the screen.

The server 300 in the present embodiment may include a content providing unit 311. The content providing unit 311 is capable of providing the display device 200 with the content data that have been stored in the content database 310.

In the following, the display control unit 220 will be described.

The display control processing unit 220 may include an input receiving unit 221, a zoom ratio determining unit 222, a position adjusting unit 223, an OSD image creating unit 224, and an image compositing unit 225.

The input receiving unit 221 is capable of receiving inputs of various signals into the display device 200. Such various signals may include, for example, a signal generated by operating an operation member included in the display device 200 and/or a signal generated by making an operation on the screen displayed in the display area. Such various signals may include, for example, a display instruction for displaying the OSD image.

The zoom ratio determining unit 222 is capable of determining whether a zoom setting is made in the display device 200. When the zoom setting is made, the zoom ratio determining unit 222 is capable of determining the zoom ratio.

When the zoom setting is made, the position adjusting unit 223 is capable of adjusting the display position of the OSD image in accordance with the zoom ratio that has been set. To be specific, the position adjusting unit 223 is capable of calculating coordinates of a reference point that determines the display position of the OSD image. The calculation of the coordinates by the position adjusting unit 223 will be described later in detail.

The OSD image creating unit 224 is capable of creating the OSD image to be displayed together with the main image. The image compositing unit 225 is capable of creating the composite image in which the main image and the OSD image are superimposed. Note that when the zoom ratio is set, the image compositing unit 225 in the present embodiment is capable of creating the composite image in which the OSD image is superimposed on the main image at the position that has been calculated by the position adjusting unit 223.

Figure 5:
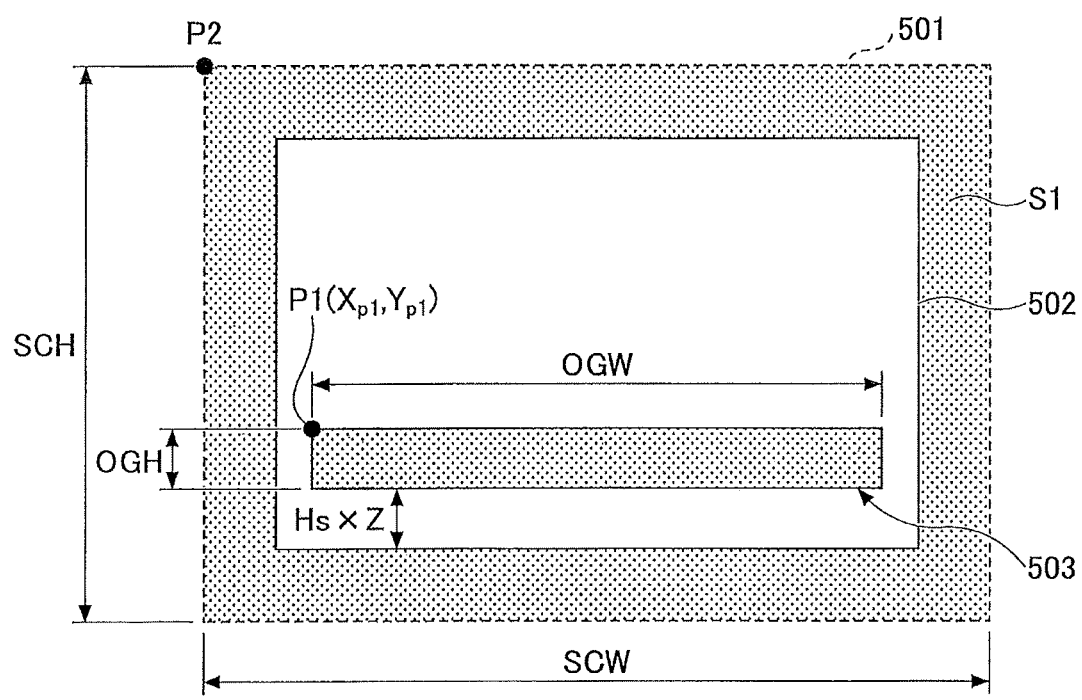
FIG. 5 is a view of one example of a process performed by a position adjusting unit.

Next, referring to FIG. 5, the calculation of the display position of the OSD image by the position adjusting unit 223 in the present embodiment will be described. FIG. 5 is a view of one example of a process performed by the position adjusting unit.

FIG. 5 illustrates one example in which an OSD image 503 is superimposed and displayed on a main image 502 the size of which is reduced to the zoom ratio of, for example, 80%. Note that with respect to a display area 501, for an area S1 where the main image 502 is not displayed, nothing is displayed because an image to be displayed does not exist.

In the present embodiment, it is assumed that a size of the display area 501, a size of the OSD image 503, and a distance between the bottom end of the main image 502 and the bottom end of the OSD image 503 are determined beforehand, when the position adjusting unit 223 calculates the display position of the OSD image 503.

The position adjusting unit 223 in the present embodiment is capable of calculating coordinates (Xp1, Yp1) of a point P1, which is an upper left point of the OSD image 503, in the following expressions (1) and (2).

$$Xp1 = (SCW - OGW)/2 \quad \text{Expression (1)}$$

$$Yp1 = SCH/2 + SCH \times Z/2 - Hs \times Z - OGH \quad \text{Expression (2)}$$
$$= SCH/2 + (SCH/2 - Hs) \times Z - OGH$$

In the above Expressions (1) and (2), SCW represents a width of the display area 501. SCH represents a height of the display area 501. OGW represents a width of the OSD image 503. OGH represents a height of the OSD image 503. Hs represents a distance between the bottom end of the main image 502 and the bottom end of the OSD image 503. Z represents a zoom ratio.

The position adjusting unit 223 in the present embodiment is capable of calculating the coordinates of the point P1 at the upper left of the OSD image 503, and determining the display position of the OSD image, because the size of the OSD image is predetermined.

For example, it is assumed that SCW is 1280 [pixels], SCH is 800 [pixels], OGW is 819 [pixels], OGH is 36 [pixels], Hs is 16 [pixels], and the zoom ratio is 100%. In other words, when no zoom ratio is set, the coordinates (Xp1, Yp1) of the point P1 can be calculated as follows. The coordinates (Xp1, Yp1) are set in accordance with coordinates of a point P2 at the upper left of the display area 501 being the point of origin (0, 0). The point P2 is included in four points that define the display area. In the following calculation, it should be noted that figures below the decimal point are omitted.

$$Xp1=(1280-819)/2=230.$$

$$Yp1=800/2+(800/2-16)\times1-36=748.$$

In contrast, when the zoom ratio is set at 80%, the coordinates (Xp1, Yp1) of the point P1 are calculated as follows.

$$Xp1=(1280-819)/2=230.$$

$$Yp1=800/2+(800/2-16)\times0.8-36=671.$$

As described above, in the present embodiment, the distance Hs between the bottom end of the main image 502 and the bottom end of the OSD image 503 is predetermined. The OSD image 503 is displayed at a position that is based on the distance Hs.

To be specific, the position adjusting unit 223 in the present embodiment uses, as a reference, the distance between the bottom end of the main image and the bottom end of the OSD image when no zoom ratio is set. The position adjusting unit 223 is capable of calculating the display position of the OSD image 503 so that a relative positional relationship between the main image and the OSD image can be maintained, when the zoom ratio is set.

In the example of FIG. 5, the distance between the bottom end of the main image and the bottom end of the OSD image is used as the reference. However, the present embodiment is not limited to this. The position adjusting unit 223 may use, as the reference, a distance between an upper end of the main image and an upper end of the OSD image. Further, in the example of FIG. 5, the position adjusting unit 223 calculates the coordinates of the point at the upper left of the OSD image. However, the present embodiment is not limited to this. The position adjusting unit 223 may calculate, for example, coordinates of a point at an upper right of the OSD image.

Figure 6:
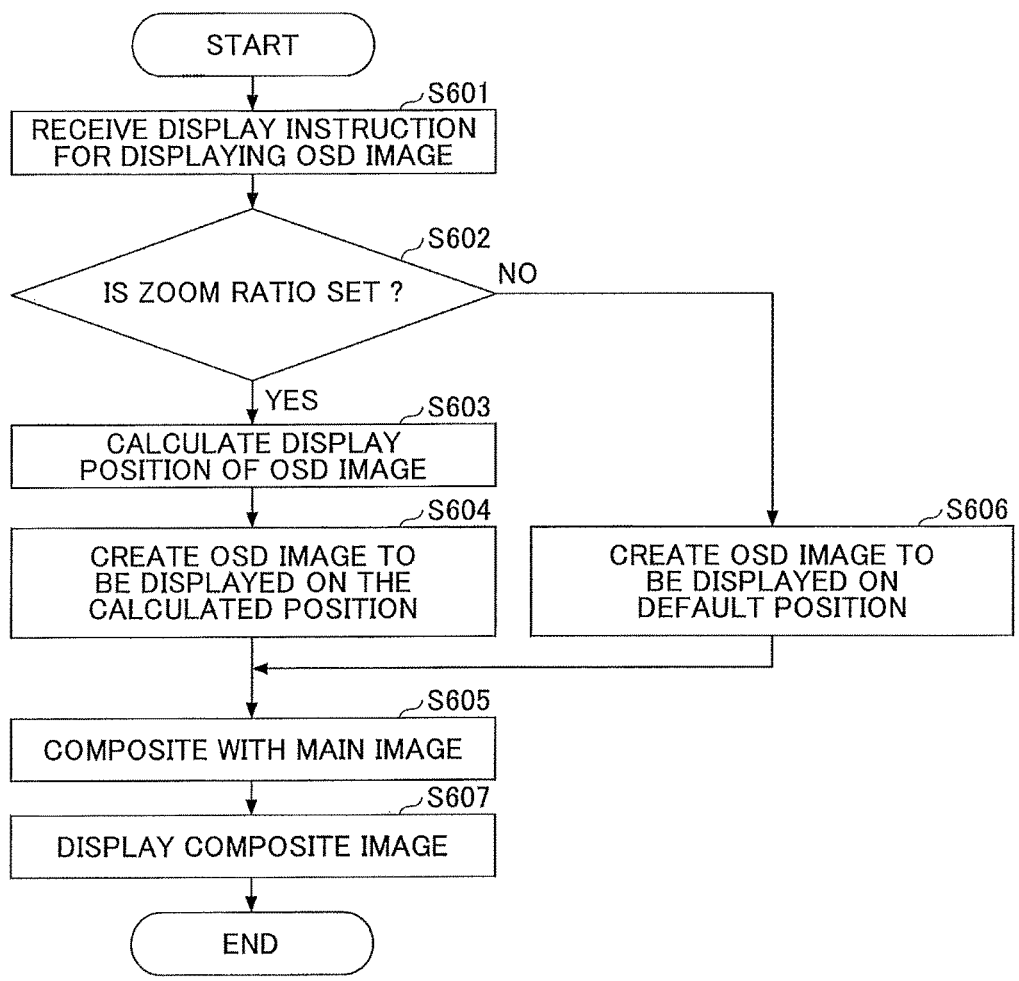
FIG. 6 is a flowchart of one example of a process performed by the display device in one embodiment.

Next, referring to FIG. 6, one example of an operation performed by the display device 200 in the present embodiment will be described. FIG. 6 is a flowchart of one example of a process performed by the display device in the present embodiment.

Regarding the display device 200 in the present embodiment, the input receiving unit 221 may receive a display instruction for displaying the OSD image (step S601). The display device 200 in the present embodiment may receive the display instruction for displaying the OSD image, in response to a switching operation for switching content data being displayed on the display device 200, for example. The display device 200 in the present embodiment may receive a display instruction for displaying the OSD image, when a given operation member of the OSD image is operated, for example, in the display device 200. The given operation member may be provided at, for example, the display device 200. Alternatively, the given operation member may be provided at a remote controller for operating the display device 200, for example.

Subsequently, in the display device 200, the zoom ratio determining unit 222 determines whether the zoom ratio is set for the display device 200 (step S602). To be specific, the zoom ratio determining unit 222 determines whether the zoom ratio is set at 100%. When the zoom ratio is set at 100%, the zoom ratio determining unit 222 determines that no zoom ratio is set. When the zoom ratio is set at any percentage other than 100%, the zoom ratio determining unit 222 determines that the zoom ratio is set.

In step S602, when it is determined that no zoom ratio is set, the process performed by the display device 200 goes to step S606 to be described later.

In step S602, when it is determined that the zoom ratio is set, the position adjusting unit of the display device 200 calculates the display position of the OSD image in accordance with the zoom ratio Z that has been set (step S603). The position adjusting unit 223 calculates the display position, as described above. Then, the OSD image creating unit 224 of the display device 200 creates the OSD image to be displayed at the position that has been calculated (step S604).

When no zoom ratio is set in step S602, the image compositing unit 225 creates a composite image in which the OSD image that has been held beforehand in the display device 200 is superimposed at the preset original position of the main image (step S605).

Subsequently, the image compositing unit 225 of the display device 200 superimposes the OSD image on the main image, and creates a composite image of the OSD image and the main image (step S606). Then, by projecting the composite image on a screen, the display unit 230 of the display device 200 displays the composite image (step S607).

As described above, in the present embodiment, the display device 200 is capable of displaying the OSD image 503 within the main image 502. Hence, the display device 200 is capable of preventing the OSD image 503 from extending outside an edge of the main image 502. In addition, the display device 200 is capable of preventing the OSD image 503 from remaining below the main image 502 within the display area 501. Therefore, in the present embodiment, the display area can be effectively used.

Note that in the present embodiment, it is assumed that the zoom ratio is not reflected in the width OGW of the OSD image in the expression (1). However, the present embodiment is not limited to this.

The value of the width OGW of the OSD image may be changed depending on, for example, the zoom ratio. For example, when the width SCW of the main image is shorter than the width OGW of the OSD image, the width OGW of the OSD image may be changed so that the OSD image is accommodated within the main image. In such a case, the OSD image creating unit 224 may adjust a font of characters to be displayed in the OSD image to be accommodated to, for example, the width OGW. The OSD image creating unit 224 may change the value of the width OGW, and may additionally display characters in the OSD image to appear by animated flow. Alternatively, the OSD image creating unit 224 may reduce the number of characters to be displayed in the OSD image, for example.

In the present embodiment, the case where the OSD image is displayed on the lower side of the main image has been described. However, the position of the OSD image to be displayed is not limited to this.

Figure 7:
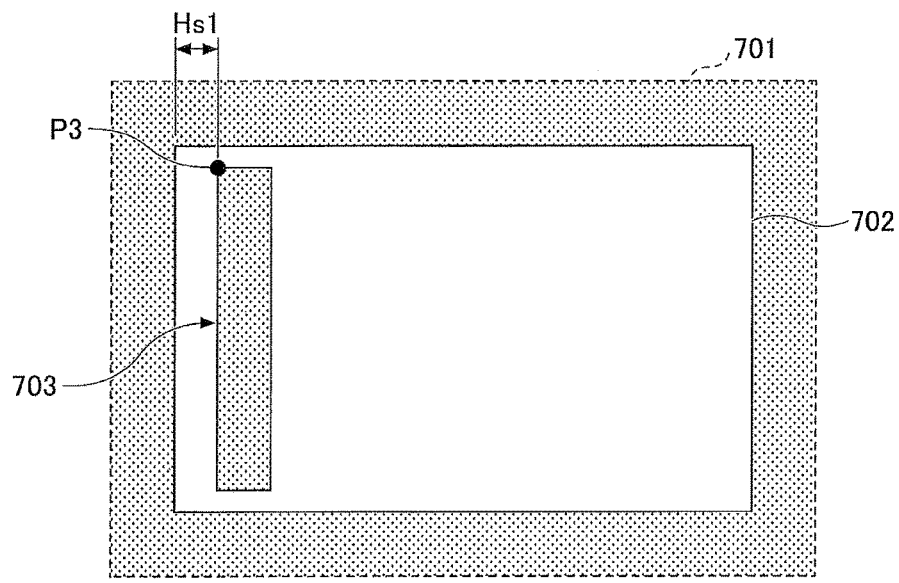
FIG. 7 is a view of one example of a display area in which an OSD image is being displayed.

FIG. 7 is a view of one example of the display area in which the OSD image is being displayed. In the present embodiment, when a main image 702 is displayed in a display area 701, an OSD image 703 may be displayed near a left end, as illustrated in FIG. 7. In such a case, the position adjusting unit 223 may determine a distance Hs1 between a left end of the main image 702 and a left end of the OSD image 703, in accordance with a distance between the left end of the main image 702 and a left end of the OSD image 703 for a state no zoom ratio is set, and the zoom ratio.

Additionally, in the present embodiment, when the zoom ratio is set for the display device 200, the display position of the OSD image is adjusted. However, the present embodiment is not limited to this. The display position of the OSD image may be, for example, decided and fixed by a user. In such a case where the display position of the OSD image is fixed, the display device 200 may allow the user to set the display position. Further, the display device 200 in the present embodiment may allow the user to set the OSD image in terms of initial position.

Another Embodiment

In the following, another embodiment will be described with reference to the drawings. The present embodiment is different from the above-described embodiment in that the OSD image is displayed in a display manner based on a type of the content data and an operating state of the display device. In the following description for another embodiment, only the differences from the above-described embodiment will be described. Identical or corresponding components to those previously defined are referred to by the same numerals, and their descriptions are omitted.

Figure 8:
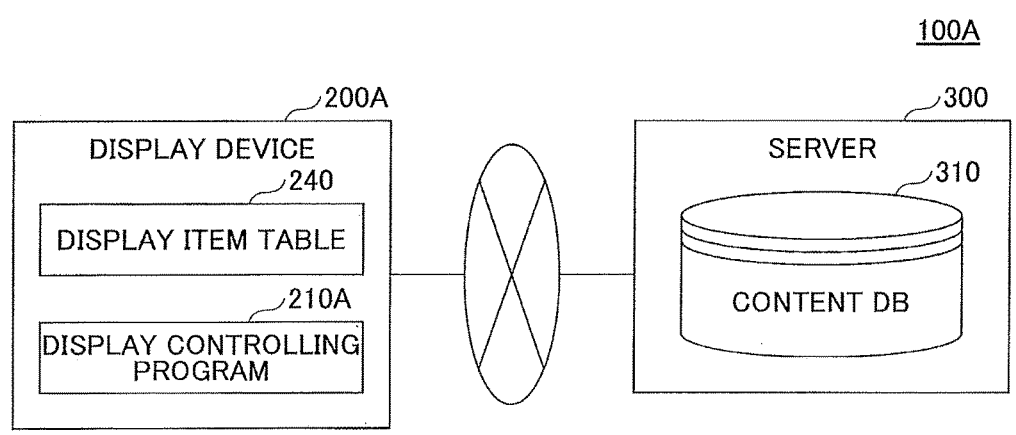
FIG. 8 is a view of one example of a system configuration of a display system in another embodiment.

FIG. 8 is a view of one example of a system configuration of a display system in the present embodiment. A display system 100A may include a display device 200A and a server 300.

In the display device 200A in the present embodiment, a display controlling program 210A may be installed. In addition, the display device 200A may include a display item table 240.

Figure 9:
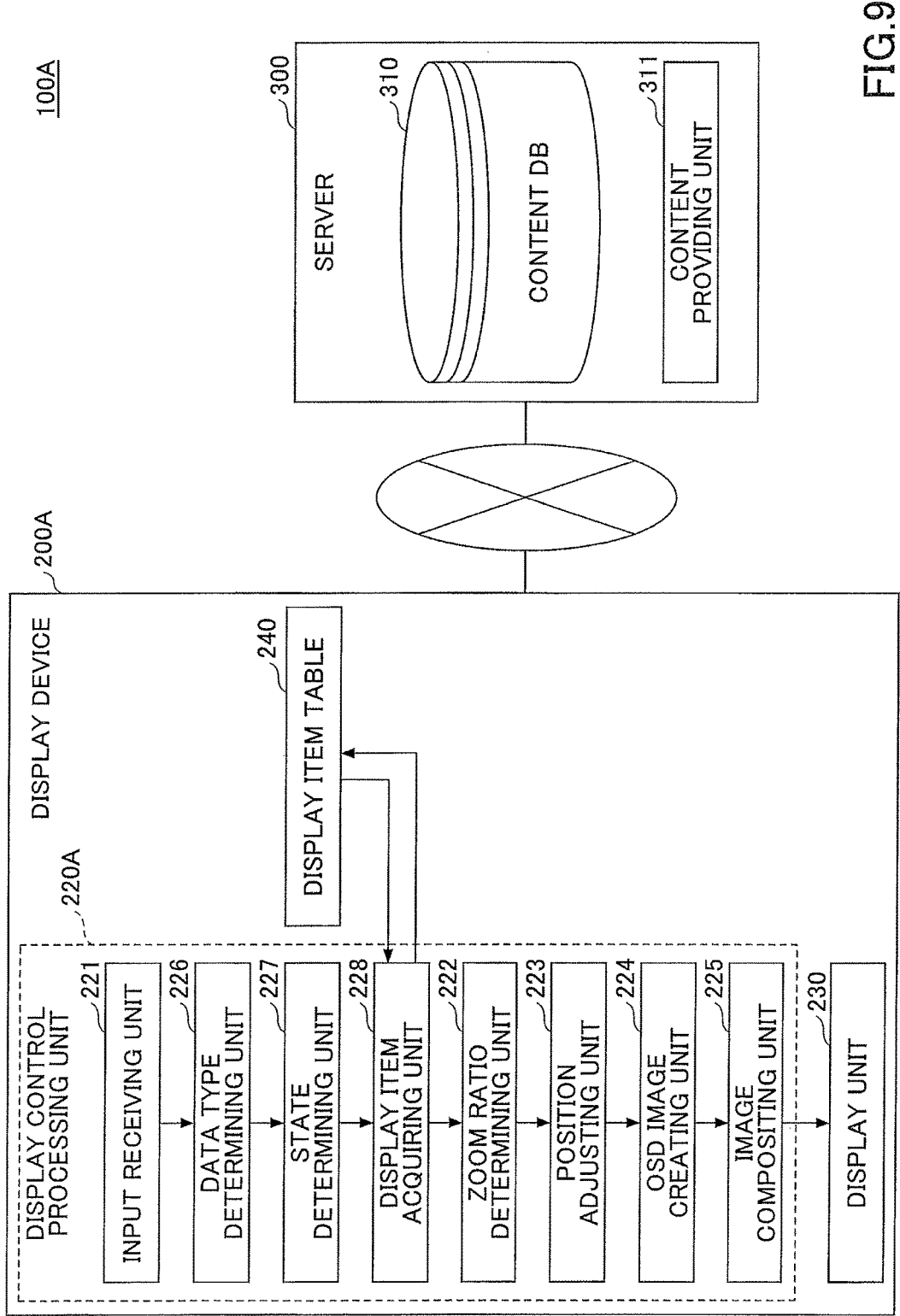
FIG. 9 is a view of one example of a functional configuration of the devices included in the display system in another embodiment.

In the following, referring to FIG. 9, functions of the devices included in the display system 100A in the present embodiment will be described. FIG. 9 is a view of one example of a functional configuration of the devices included in the display system 100A in the present embodiment.

The display device 200A in the present embodiment may include a display control processing unit 220A. The display control processing unit 220A may be enabled by the CPU 21 performing the display controlling program 210A.

The display item table 240 in the present embodiment is a table in which items to be displayed in the OSD image are stored. A display item acquiring unit 228 refers to the display item table 240, when acquiring a display item based on the type of content data and the operating state of the display device 200A. The display item table 240 will be described later in detail.

The display control processing unit 220A in the present embodiment may include a data type determining unit 226, a state determining unit 227, and a display item acquiring unit 228, in addition to the units included in the display control processing unit 220 in the above-described embodiment.

The data type determining unit 226 is capable of determining the type of content data to which a display instruction has been given. To be specific, the data type determining unit 226 in the present embodiment is capable of determining whether the content data is any one of video data, still image data, or slide show data.

The state determining unit 227 is capable of determining the operating state of the display device 200. Examples of the operating state of the display device 200 may include a state where the display device 200 is displaying the content data, a state where the display device 200 stops displaying temporarily, and a state where the display device 200 stops displaying (does not display the content data).

By referring to the data type and the operating state of the display item table 240, the display item acquiring unit 228 is capable of acquiring the items to be displayed in the OSD image.

In the following, referring to FIG. 10, the display item table 240 will be described.

FIG. 10 is a view of one example of the display item table. The display item table 240 in the present embodiment may include the data type, the operating state, and the display item, which serve as information items.

The value of item "data type" represents a type of the content data that has been input into the display device 200A. The "data type" in the present embodiment may include video data, still image data, and slide show data. Slide show data includes a plurality of still image data and display control information in which a display order and a display period of the plurality of still image data are set.

The value of item "operating state" represents an operating state of the display device 200A. The operating state in the present embodiment may be playing or playing stopped, when the content data is, for example, video data. The operating state may be displaying an image, when the content data is a still image. Alternatively, the operating state may be a waiting state, when the content data is not input.

The item "display item" represents an item (text data) to be displayed in the OSD image. In the example of FIG. 10, when the content data is video data and the operating state is playing, it is understood that "stop", "fast-forward", "rewind", and "pause" are displayed in the OSD image.

Figure 11:
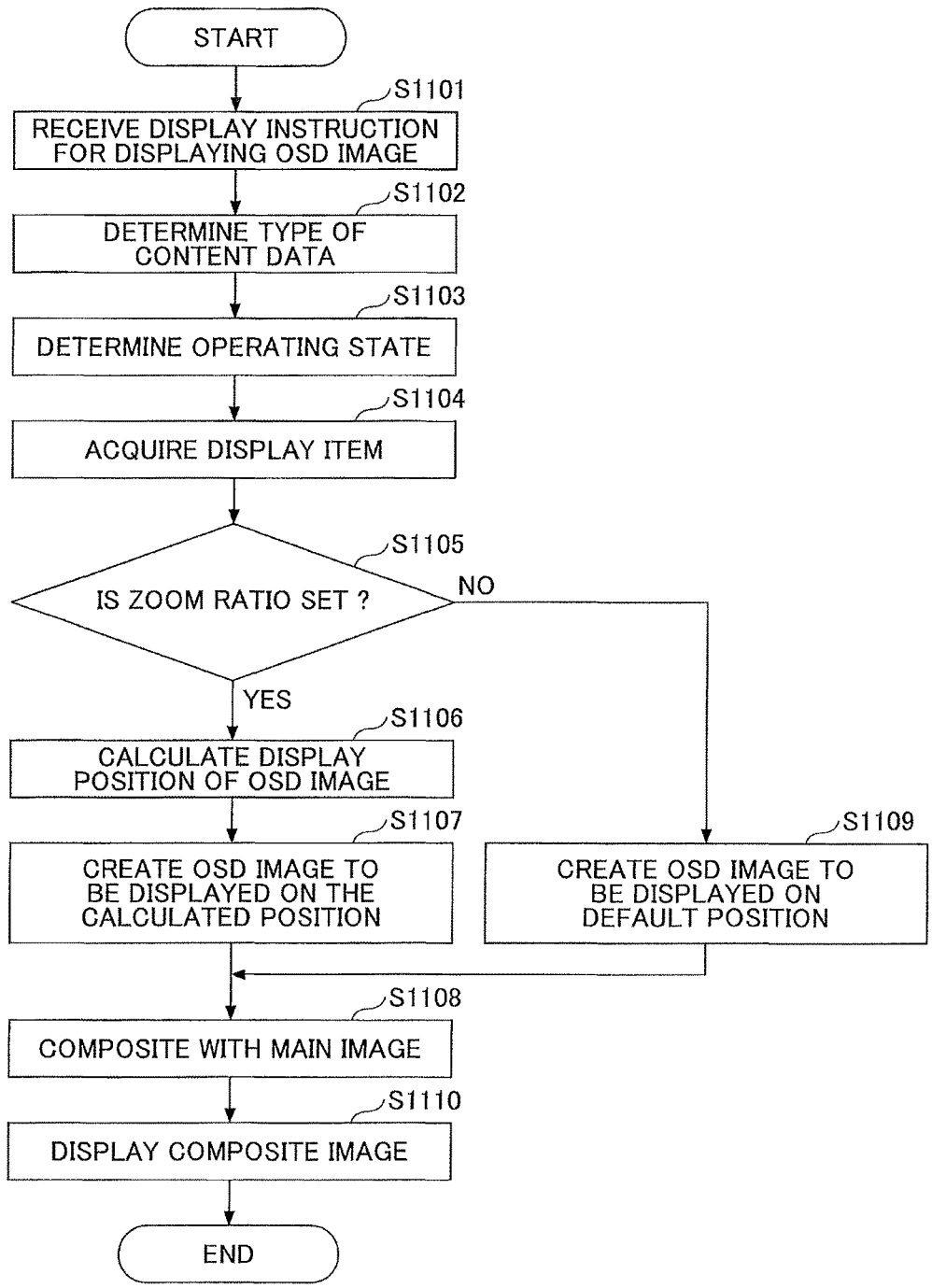
FIG. 11 is a flowchart of one example of the process performed by the display device in another embodiment.

Next, referring to FIG. 11, one example of an operation of the display device 200A in a second embodiment will be described. FIG. 11 is a flowchart of one example of a process performed by the display device 200A in the second embodiment.

The input receiving unit 221 of the display device 200A in the present embodiment receives a display instruction for displaying the OSD image (step S1101).

Subsequently, the data type determining unit 226 of the display device 200A determines the type of data content that has been input (step S1102). Then, the state determining unit 227 of the display device 200A determines the operating state of the display device 200A (step S1103).

Next, by referring to the display item table 240, the display item acquiring unit 228 of the display device 200A acquires the items to be displayed in the OSD image (step S1104). More specifically, by referring to the display item table 240, the display item acquiring unit 228 acquires the display items that correspond to the data type and the operating state. For example, when the content data is video data and the operating state is playing, the display item acquiring unit 228 acquires "stop", "fast-forward", "rewind", and "pause", as the items to be displayed in the OSD image.

Subsequently, the zoom ratio determining unit 222 of the display device 200A determines whether the zoom ratio is set (step S1105).

The process from step S1105 to step S1110 in FIG. 11 is the same as from step S602 to step S607 in FIG. 6. Accordingly, descriptions of the process from step S1105 to step S1110 in FIG. 11 are omitted.

As described above, in the present embodiment, the OSD image can be displayed in accordance with the type of content data that has been input into the display device 200A and the operating state of the display device 200A.

Additional Embodiment

In the following, an additional embodiment will be described with reference to the drawings. The additional embodiment is different from the above-described embodiments in that the display item of the OSD image is acquired from a server. In the following description of an additional embodiment, only the differences from the above-described embodiments will be described. Identical or corresponding components to those previously defined are referred to by the same numerals, and their descriptions are omitted.

Figure 12:
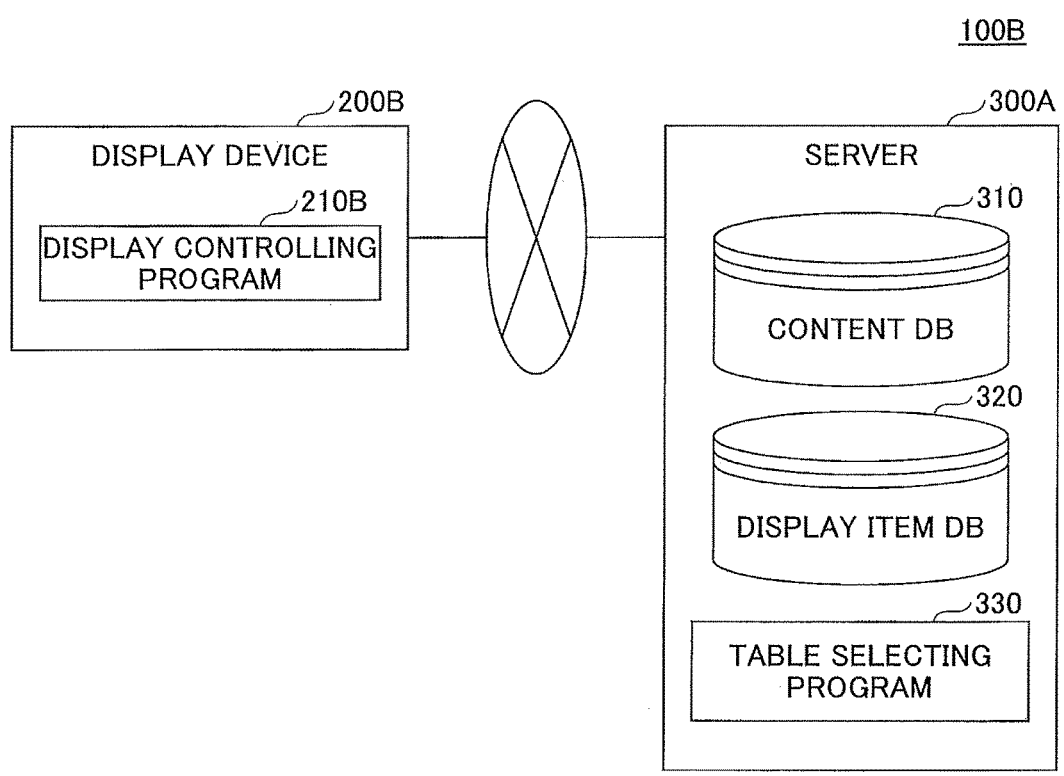
FIG. 12 is a view of one example of a system configuration of the display system in an additional embodiment.

FIG. 12 is a view of one example of a system configuration of a display system 100B in the present embodiment. The display system 100B in the present embodiment may include a display device 200B and a server 300A.

A display controlling program 220B may be installed in the display device 200B in the present embodiment.

The server 300A in the present embodiment may include a content database 310, and a display item database 320. Additionally, a table selecting program 330 may be installed in the server 300A.

Figure 13:
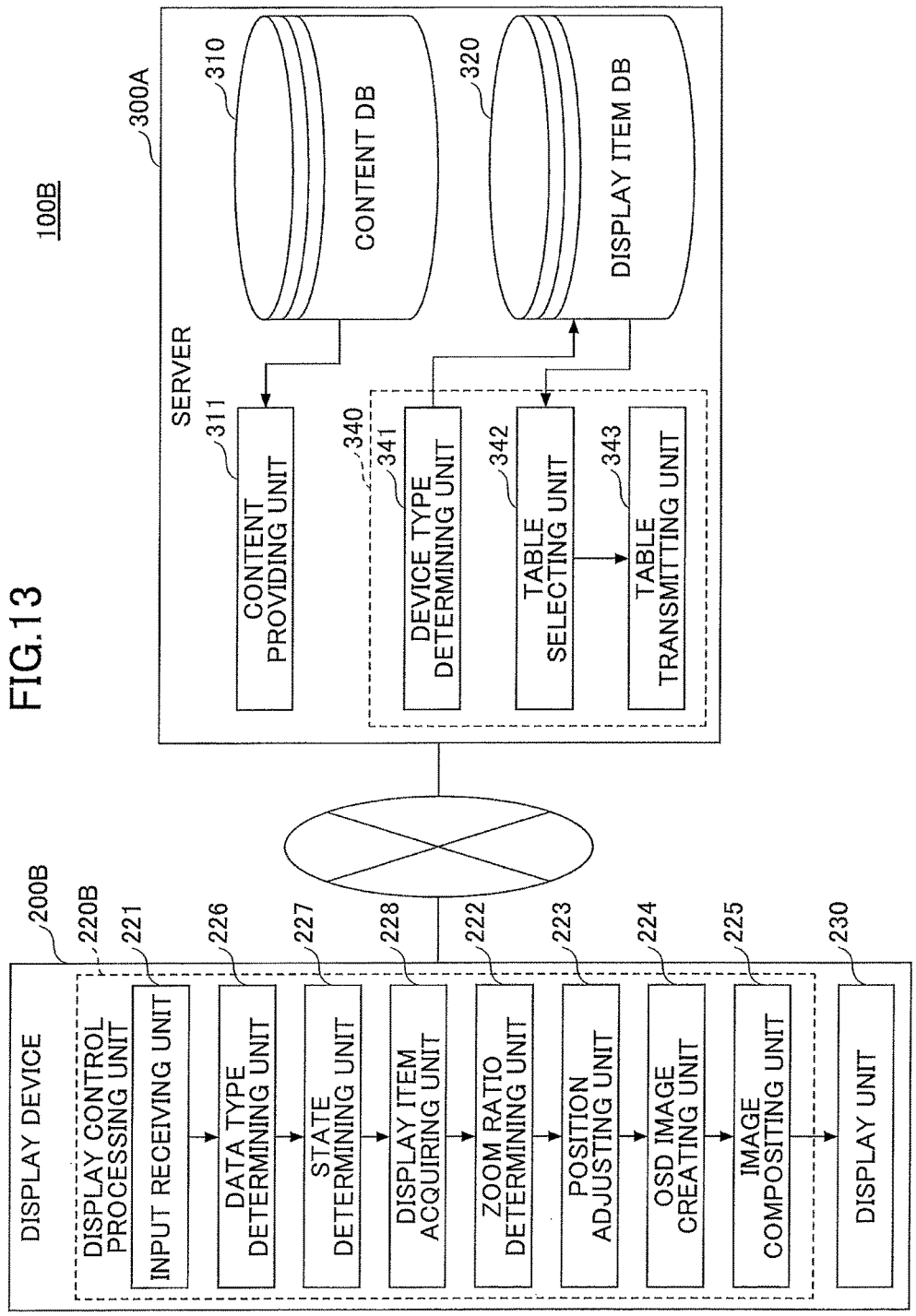
FIG. 13 is a view of one example of a functional configuration of the devices included in the display system in an additional embodiment.

In the following, referring to FIG. 13, functions of the devices included in the display system 100B in the present embodiment will be described. FIG. 13 is a view of one example of a functional configuration of the devices included in the display system 100B in the present embodiment.

The display device 200B in the present embodiment includes a display control processing unit 220B. The display control processing unit 220B may be enabled by the CPU 21 performing the display controlling program 210B.

The display control processing unit 220B in the present embodiment is different from the display control processing unit 220A in the above-described embodiments in that the display item table 240 is not included and the display item acquiring unit 228 acquires the display items from the server 300A.

The display item tables 240 for respective device types of the display device 200B may be stored in the display item database 320 of the server 300A in the present embodiment. The display item database 320 will be described later in detail.

The server 300A in the present embodiment may include a table selection processing unit 340. The table selection processing unit 340 may be enabled by the CPU included in the server 300A running the table selecting program 330.

In the server 300A in the present embodiment, the table selection processing unit 340 may include a device type determining unit 341, a table selecting unit 342, and a table transmitting unit 343.

The device type determining unit 341 is capable of acquiring from the display device 200B device type identification information indicating the device type of the display device 200B to which the content data has been provided by the content providing unit 311 included in the server 300A, and thus is capable of determining the device type of the display device 200B.

By referring to the display item database 320, the table selecting unit 342 is capable of selecting a display item table associated with the device type that has been determined. The table transmitting unit 343 is capable of transmitting to the display device 200B the display item table that has been selected.

Figures 14, 15:
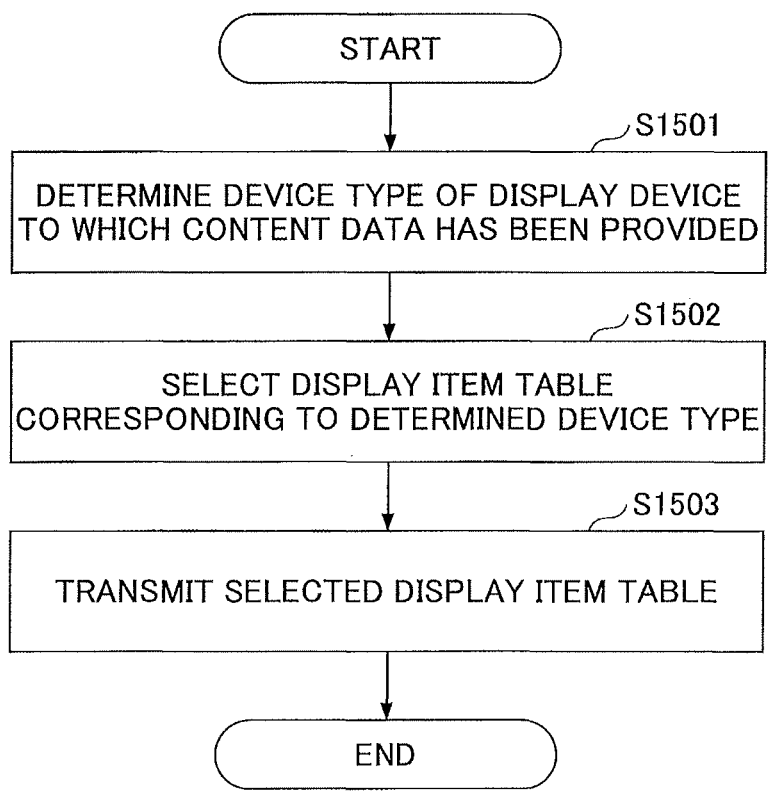
FIG. 14 is a view of one example of a display item database.
FIG. 15 is a flowchart of an operation of the server in an additional embodiment.

In the following, the display item database 320 will be described. FIG. 14 is a view of one example of the display item database 320.

In the display item database 320 in the present embodiment, associations between the device type identification information for identifying the device type of the display device 200B and the display item table for each device type are defined. The display item table in the present embodiment corresponds to the display item table 240 that has been described in the above-described embodiment.

In the example of FIG. 14, it is understood that, for example, device type identification information "AA" and a display item table 1 are associated with each other.

In the following, referring to FIG. 15, one example of an operation performed by the server 300A in the present embodiment will be described. FIG. 15 is a flowchart of an operation of the server 300A in a third embodiment.

The device type determining unit 341 of the server 300A in the present embodiment determines the device type of the display device 200B to which the content data has been provided by the content providing unit 311 (step S1501). Subsequently, by referring to the display item database 320, the table selecting unit 342 of the server 300A selects the display item table associated with the device type that has been determined (step S1502). Then, the table transmitting unit 343 of the server 300A transmits to the display device 200B the display item table that has been selected (step S1503).

Figure 16:
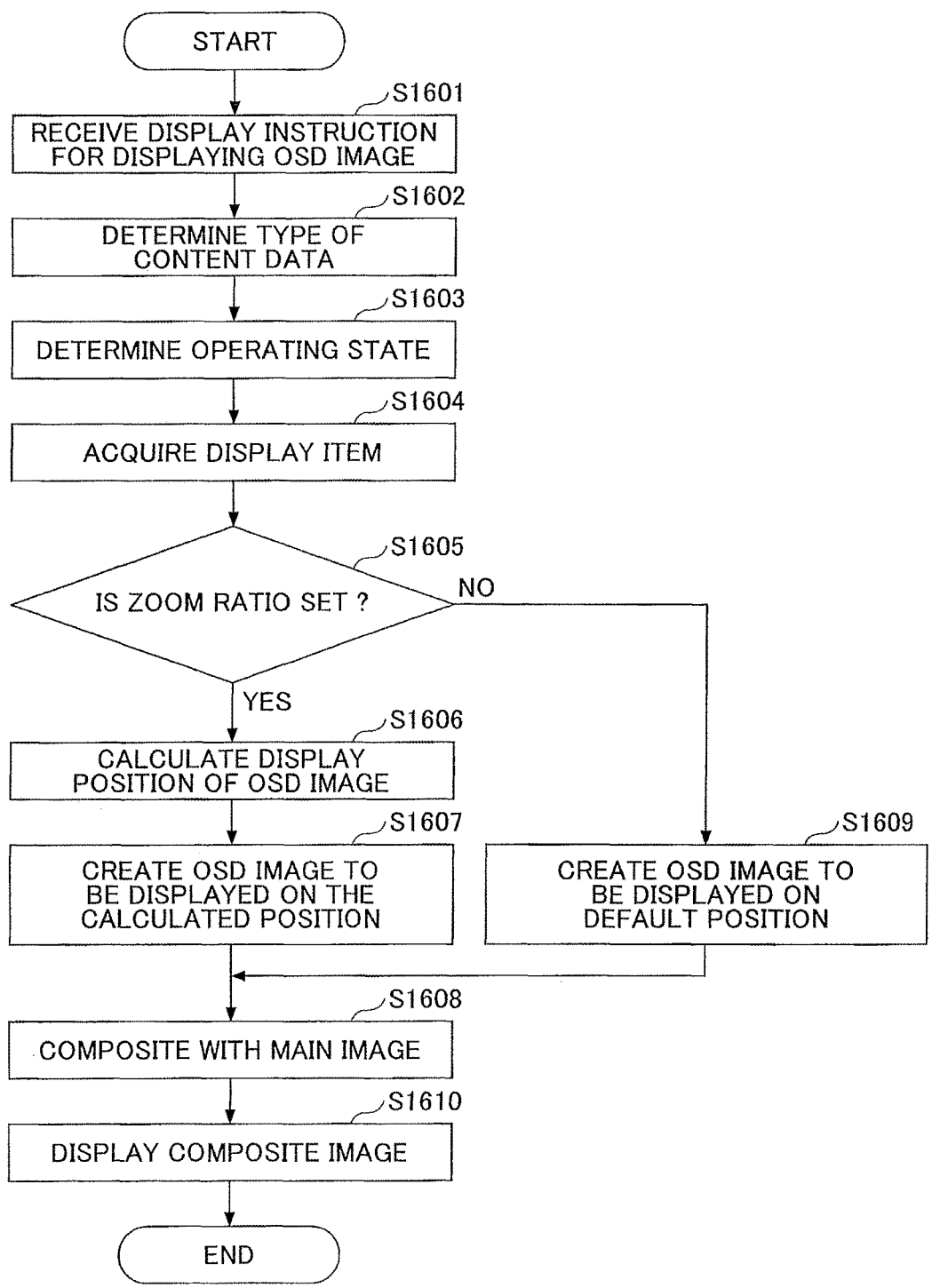
FIG. 16 is a flowchart of one example of the process performed by the display device in an additional embodiment.

Next, referring to FIG. 16, one example of an operation performed by the display device 200B in the present embodiment will be described. FIG. 16 is a flowchart of one example of a process performed by the display device 200B in the present embodiment.

The input receiving unit 221 of the display device 200B in the present embodiment receives a display instruction for displaying an OSD image (step S1601). Then, the data type determining unit 226 of the display device 200B determines the type of content data that has been acquired from the server 300A (step S1602). Subsequently, the state determining unit 227 of the display device 200B determines the operating state of the display device 200B (step S1603).

Then, by referring to the display item table that has been received from the server 300A, the display item acquiring unit 228 of the display device 200B acquires the display items that correspond to the data type and the operating state (step S1604).

Subsequently, the zoom ratio determining unit 222 of the display device 200B determines whether the zoom ratio is set in the display device 200B (step S1605).

The process from step S1605 to step S1610 in FIG. 16 is the same as from step S602 to step S607 in FIG. 6. Accordingly, descriptions of the process from step S1605 to step S1610 in FIG. 16 are omitted.

As described above, in the present embodiment, the OSD image is displayed in accordance with the type of content data that has been input into the display device 200A and the operating state of the display device 200A.

In the present embodiment, the server 300A acquires the display item table. This configuration eliminates the need for storing the display item table in the display device 200B, and thus enables reduction of the memory capacity of the display device 200B.

In the present embodiment, the display device 200B acquires the display item table from the server 300A. However, the present embodiment is not limited to this. The display device 200B may not necessarily acquire the display item table. By referring to the display item table that has been selected by the server 300A, the display device 200B may acquire from the server 300A only the display items that correspond to the data type and the operating state.

Heretofore, the embodiments of the display device, the display system, and the display controlling program have been described. However, the present disclosure is not limited to the above-described embodiments. Various modifications and improvements are applicable within the scope of the present disclosure. Although specific examples with values have been described to facilitate understanding of the present disclosure, these values are merely examples and any value may be applicable, if not otherwise specified. Grouping of items in the above description is not a substantive matter in the present disclosure. The contents listed in two or more items may be combined and used as appropriate, or the content listed in a specific item may be applied to another content listed in another item (as long as consistent). Any boundary between functional units or processing units in a functional block diagram may not necessarily correspond to a boundary between physical components. Operations of a plurality of functional units may be physically performed by a single component, or an operation of a single functional unit may be physically performed by a plurality of components. For the sake of description, a communication terminal and an information processing device have been described using functional block diagrams, but such devices may be enabled by hardware, software, or any combination of hardware and software. Software that operates in the present disclosure may be stored in any suitable recording medium, such as a Random Access Memory (RAM), a flash memory, a Read Only Memory (ROM), an EPROM, an EEPROM, a register, a hard disk (HDD), a removable disk, a CD-ROM, a database, a server, and the like.

The present disclosure is achievable by any adaptable embodiment, for example, special-purpose hardware, or any combination of special-purpose hardware and software. The present disclosure is enabled as computer software that is performed by a processing device coupled to one or more networks. Such one or more networks may include all existing land communications and wireless communication networks, such as the Internet. The processing device may include any suitably programmed device such as general-purpose computers, PDAs, and mobile telephones (telephones in compliance with LTE or 3G). Since one or more embodiments in the present disclosure may be performed through software, computer software that can be installed on a programmable device may include all aspects of the present disclosure. The computer software can be supplied to a programmable device by using all non-transitory recording media for recording codes that can be read by a processor, such as a floppy disk, a hard disk, a CD-ROM, a magnetic tape, or a solid-state recording device.

A hardware platform includes all desired hardware resources including, for example, a Central Processing Unit (CPU), a Random Access Memory (RAM), and a Hard Disk Drive (HDD). The CPU can be configured with any desired processor type and any desired number of processors. The RAM can be configured with any desired volatile or non-volatile memory. The HDD can be configured with any desired non-volatile memory capable of recording a large amount of data. The hardware resource may further include an input device, an output device, or a network device, in accordance with the type of device. Alternatively, the HDD may be provided at the outside of the device, as long as the HDD is accessible. In this example, while the CPU and the RAM function as physical memory or main memory like a CPU cache memory, the HDD can function as a secondary memory of the device.

What is claimed is:

1. A display device configured to display, in a display area of the display device, a first image and a second image superimposed on the first image, the display device comprising:
   processing circuitry configured to
   (a) determine whether an adjusted zoom ratio different from a current zoom ratio is set for the first image, the first image having a size associated with the current zoom ratio being modified based on the adjusted zoom ratio to an adjusted-size first image:
   (b) determine a type of the first image;
   (c) determine an operating state of the display device;
   (d) acquire an item to be displayed in the second image that indicates information on the display device in accordance with the type determined in (b) and the operating state determined in (c); and
   (e) perform an adjusting step including (e1) determining a distance, prior to zooming, between a bottom end of the first image and a bottom end of the second image, (e2) determining an adjustment to a display position of the second image, based on at least (i) the distance prior to zooming, determined in (e1), between the bottom end of the first image and the bottom end of the second image, (ii) the adjusted zoom ratio that is set, and (iii) a height and a width of the second image, and (e3) performing the adjustment determined in (e2) to the display position of the second image, in response to the determining in (a) that the adjusted zoom ratio different from the current zoom ratio is set for the first image.

2. The display device according to claim 1, wherein the processing circuitry is further configured to adjust the display position of the second image such that an entirety of the second image is superimposed on the first image.

3. The display device according to claim 2, wherein the processing circuitry is further configured to calculate coordinates of a given point of the second image in accordance with coordinates of any one of four points that identify a display area, a relative position of the second image with respect to the first image, and a size of the second image.

4. The display device according to claim 3, wherein the processing circuitry is further configured to calculate the coordinate of the given point of the second image such that a relative position of the bottom end of the second image with respect to the bottom end of the first image remains the same.

5. The display device according to claim 1, wherein the processing circuitry is further configured to generate second image data to display the second image,
   wherein when part of the second image is superimposed on the first image, the processing circuitry is further configured to generate the second image data such that the entirety of the second image is superimposed on the first image.

6. The display device according to claim 1, wherein the second image includes an On-Screen Display (OSD) image that displays at least one of information on a setting for the display device and information on an operation.

7. The display device according to claim 1, wherein the processing circuitry is further configured to adjust the second image at the adjusted display position, if necessary, to fit, without applying the adjusted zoom ratio to, the second image within the first image to prevent the second image from extending outside the first image, while maintaining the distance between the bottom end of the first image and the bottom end of the second image, even when a distance between the bottom end of the first image and a bottom end of the display area changes.

8. The display device according to claim 1, wherein the processing circuitry is further configured to determine the adjustment based on a height and a width of the display area.

9. A display system, comprising:
   a display device configured to display, in a display area of the display device, a first image and a second image superimposed on the first image; and
   a server configured to provide the display device with image data,
   wherein the display device includes processing circuitry configured to:
   (a) determine whether an adjusted zoom ratio is set different from a current zoom ratio for the first image, the first image having a size associated with the current zoom ratio being modified based on the adjusted zoom ratio to an adjusted-size first image;
   (b) determine a type of the first image;
   (c) determine an operating state of the display device;
   (d) acquire an item to be displayed in the second image that indicates information on the display device in accordance with the type determined by the data type determining unit and the operating state determined by the state determining unit; and
   (e) perform an adjusting step including (e1) determining a distance, prior to zooming, between a bottom end of the first image and a bottom end of the second image, (e2) determining an adjustment to a display position of the second image, based on at least (i) the distance prior to zooming, determined in (e1), between the bottom end of the first image and the bottom end of the second image, (ii) the adjusted zoom ratio that is set, and (iii) a height and a width of the second image, and (e3) performing the adjustment determined in (e2) to the display position of the second image, in response to the determining in (a) that the adjusted zoom ratio different from the current zoom ratio is set for the first image.

10. A non-transitory recording medium storing a program for causing a computer in a display device configured to display, in a display area of the display device, a first image and a second image superimposed on the first image and to execute processing of:

(a) determining whether an adjusted zoom ratio different from a current zoom ratio is set for the first image, the first image having a size associated with the current zoom ratio being modified based on the adjusted zoom ratio to an adjusted-size first image;

(b) determining a type of the first image;

(c) determining an operating state of the display device;

(d) acquiring an item to be displayed in the second image that indicates information on the display device in accordance with the determined type and the determined operating state; and (e) performing an adjusting step including (e1) determining a distance, prior to zooming, between a bottom end of the first image and a bottom end of the second image, (e2) determining an adjustment to a display position of the second image, based on at least (i) the distance prior to zooming, determined in (e1), between the bottom end of the first image and the bottom end of the second image, (ii) the adjusted zoom ratio that is set, and (iii) a height and a width of the second image, and (e3) performing the adjustment determined in (e2) to the display position of the second image, in response to the determining in (a) that the adjusted zoom ratio different from the current zoom ratio is set for the first image.

* * * * *